United States Patent
Glugla

(10) Patent No.: US 10,989,129 B1
(45) Date of Patent: Apr. 27, 2021

(54) SYSTEMS AND METHODS FOR ADJUSTING FUELING IN A CYLINDER WITH A PRE-CHAMBER

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/719,726

(22) Filed: Dec. 18, 2019

(51) Int. Cl.
| F02M 1/00 | (2006.01) |
| F02D 41/18 | (2006.01) |
| F02F 1/22 | (2006.01) |
| F02D 41/38 | (2006.01) |
| F02F 7/00 | (2006.01) |
| F02D 41/00 | (2006.01) |
| F02F 11/00 | (2006.01) |

(52) U.S. Cl.
CPC ......... *F02D 41/182* (2013.01); *F02D 41/008* (2013.01); *F02D 41/3836* (2013.01); *F02F 1/22* (2013.01); *F02F 7/0002* (2013.01); *F02F 11/00* (2013.01)

(58) Field of Classification Search
CPC ........................ F02M 25/08; F02M 25/0836; F02D 19/0621; F02D 41/003; F02D 41/0037; F02D 41/0032; F02D 41/0045; F02D 41/0042
USPC ................................ 123/516, 520, 522, 527
See application file for complete search history.

(56) References Cited

U.S. PATENT DOCUMENTS

| 4,901,687 | A | 2/1990 | Jones |
| 6,293,095 | B1 | 9/2001 | Yamamoto et al. |
| 8,146,555 | B2 | 4/2012 | Solomon et al. |
| 9,353,674 | B2 | 5/2016 | Bunce et al. |
| 10,018,104 | B2 | 7/2018 | Grover, Jr. et al. |
| 10,400,696 | B2 | 9/2019 | Blaxill et al. |
| 2004/0000352 | A1* | 1/2004 | Kojima ................ B01D 53/229 141/45 |
| 2012/0090298 | A1* | 4/2012 | Cleeves .................... F02D 9/02 60/274 |
| 2015/0252741 | A1* | 9/2015 | Sixel .................. F02D 19/0642 123/472 |

OTHER PUBLICATIONS

Glugla, C. et al., "Systems and Methods for Fouling Reduction in a Pre-Chamber," U.S. Appl. No. 16/788,485, filed Feb. 12, 2020, 57 pages.

* cited by examiner

*Primary Examiner* — John Kwon
(74) *Attorney, Agent, or Firm* — Geoffrey Brumbaugh; McCoy Russell LLP

(57) ABSTRACT

Methods and systems are provided for operating a cylinder of an engine including a pre-chamber ignition system. In one example, a method may include determining amounts of pre-chamber gases in the cylinder prior to combustion, and adjusting an amount of fuel injected into the cylinder based on the amounts of pre-chamber gases in the cylinder. In this way, cylinder fueling may be compensated for additional air and/or fuel from the pre-chamber gases, which may increase an accuracy of the cylinder fueling and increase cylinder efficiency.

5 Claims, 6 Drawing Sheets

SYSTEMS AND METHODS FOR ADJUSTING FUELING IN A CYLINDER WITH A PRE-CHAMBER

FIELD

The present description relates generally to methods and systems for controlling a vehicle engine to determine cylinder fueling in a cylinder with an active pre-chamber.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." The pre-chamber may be walled chamber located in the clearance volume of the cylinder, and may include a spark plug, an $O_2$ or air injector, and a fuel injector. During engine operation, a first air-fuel mixture is introduced into the pre-chamber, and a second air-fuel mixture is introduced into the cylinder. When ignition is requested, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder to produce torque. Residual gases from combusting the first air-fuel mixture may be actively purged from the pre-chamber to the cylinder by injecting air (or $O_2$) into the pre-chamber, providing fresh air for a subsequent pre-chamber combustion.

Pre-chamber ignition may offer performance and efficiency benefits over a spark-ignition engine in some situations. For example, a cylinder with pre-chamber ignition may operate with a higher (e.g., leaner) air-fuel ratio (AFR) than a similar cylinder of a spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, gases may flow from the pre-chamber to the cylinder via the one or more holes in the pre-chamber walls, which may affect the AFR of the cylinder. For example, air or $O_2$ from the active purging may flow from the pre-chamber to the cylinder, such as when the pressure in the cylinder is lower than the pressure in the pre-chamber, leading to a higher (e.g., leaner) cylinder AFR than expected. As another example, the residual gases from the pre-chamber may dilute the air in the cylinder. As still another example, the residual gases from the pre-chamber may be fuel-rich, which may result in a lower (e.g., richer) cylinder AFR than expected. When the AFR of the cylinder is not accurately controlled, vehicle emissions may increase.

The inventors herein have identified the above-mentioned issues and have identified a method to at least partially address them. In one example, a method comprises: adjusting a fuel injection amount to a cylinder based on an amount of pre-chamber gases in the cylinder during a compression stroke of the cylinder. In this way, the cylinder fuel amount may be adjusted to compensate for pre-chamber gases in the cylinder prior to combustion in order to more accurately operate the cylinder at a desired AFR.

As one example, the pre-chamber gases may flow to the cylinder from a pre-chamber coupled to the cylinder via an opening in the walls of the pre-chamber, and the amount of pre-chamber gases may be determined based on a pressure difference between the pre-chamber and the cylinder. As an example, as a pressure of the cylinder further decreases below a pressure of the pre-chamber, the amount of pre-chamber gases in the cylinder may increase. This pressure difference may be determined based on an injection pressure of the pre-chamber and a position of a piston within the cylinder. For example, the injection pressure of the pre-chamber may be a pressure greater than or equal to a peak pressure of the cylinder. Further, the amount of pre-chamber gases that flow into the cylinder may include one or more of an amount of pre-chamber air, an amount of pre-chamber fuel, and an amount of pre-chamber combustion gases from a previous combustion cycle. As one example, adjusting the fuel injection amount to the cylinder may include decreasing the fuel injection amount to the cylinder as the amount of pre-chamber combustion gases from the previous combustion cycle increases, as the pre-chamber combustion gases may dilute a cylinder air charge. As another example, adjusting the fuel injection amount to the cylinder may include decreasing the fuel injection amount to the cylinder as the amount of pre-chamber fuel in the cylinder increases. Additionally or alternatively, adjusting the fuel injection amount to the cylinder may include increasing the fuel injection amount to the cylinder as the amount of pre-chamber air in the cylinder during the compression stroke increases. Adjusting the fuel injection amount to the cylinder may be further based on an amount of air inducted into the cylinder through an intake valve of the cylinder. As a result, cylinder efficiency may be increased.

In this way, a fuel injection amount to a cylinder may be adjusted based on an amount of pre-chamber gases in the cylinder during a compression stroke of the cylinder. By adjusting the fuel injection amount, cylinder fueling may be more accurate relative to systems without compensation, which may increase a performance of the cylinder. Further, by compensating the fuel injection amount for the amount and composition of pre-chamber gases in the cylinder, the controller may prevent the cylinder from operating at a non-stoichiometric AFR, which may increase a fuel efficiency of the vehicle and decrease vehicle emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
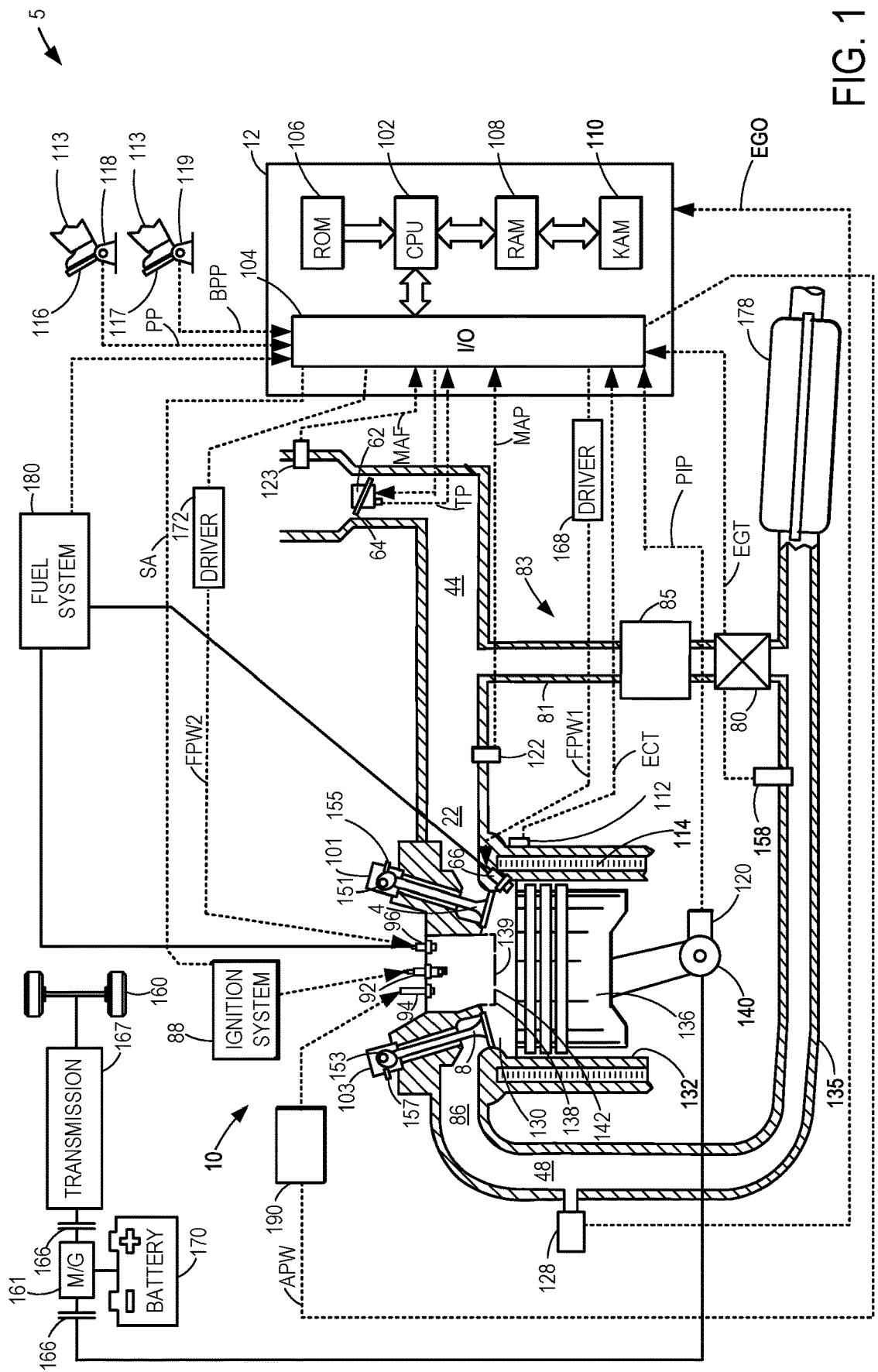
FIG. 1 shows a schematic depiction of a cylinder configuration in an engine system of a vehicle.
Figure 4:
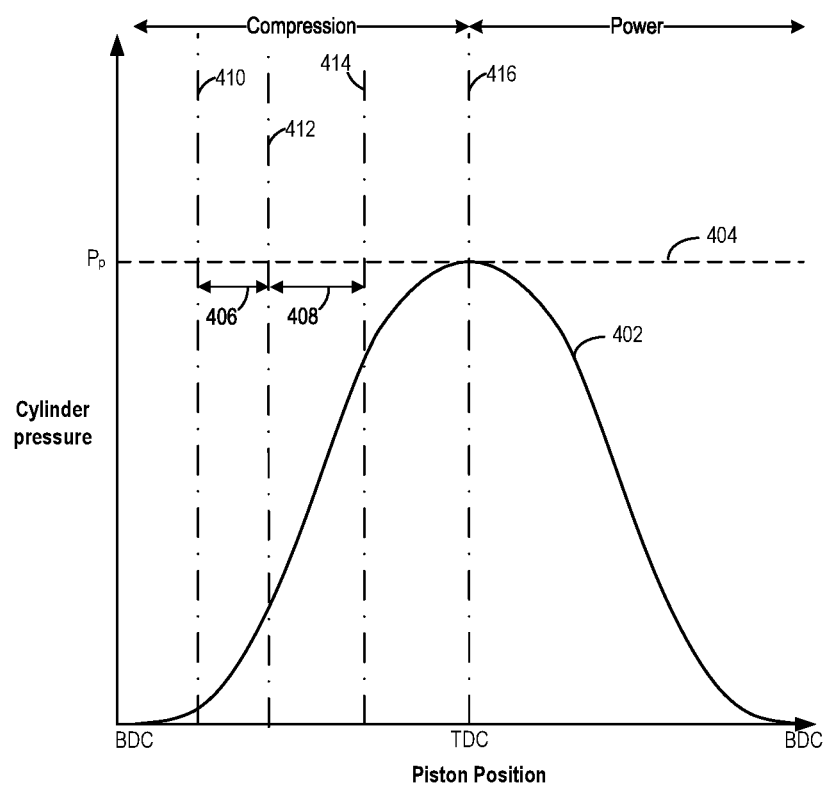
FIG. 4 shows an example graph of pressure in a cylinder relative to position of a piston.
Figure 5:
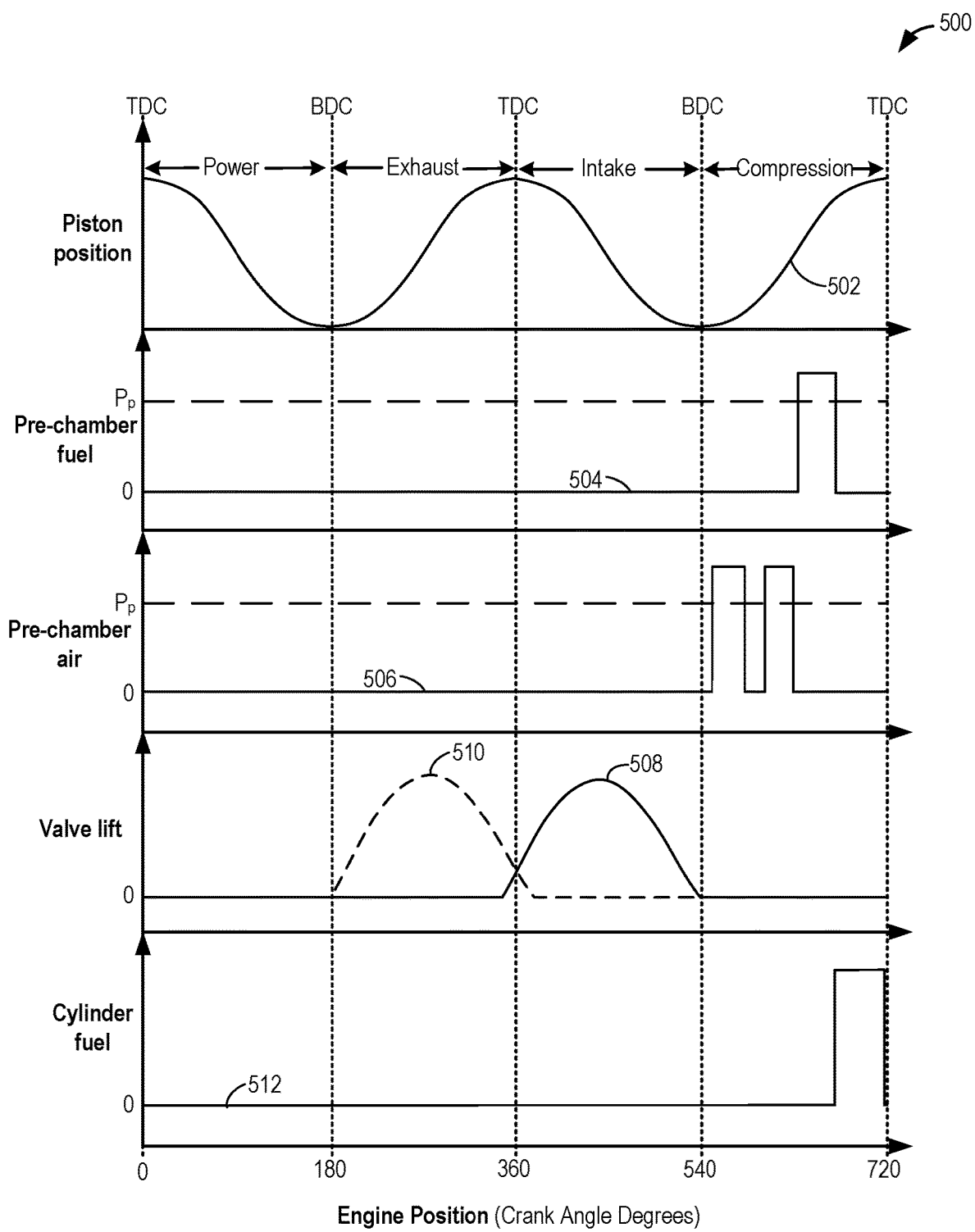
FIG. 5 shows a prophetic example timeline of operating a pre-chamber and a cylinder with pre-chamber purging.
Figure 6:
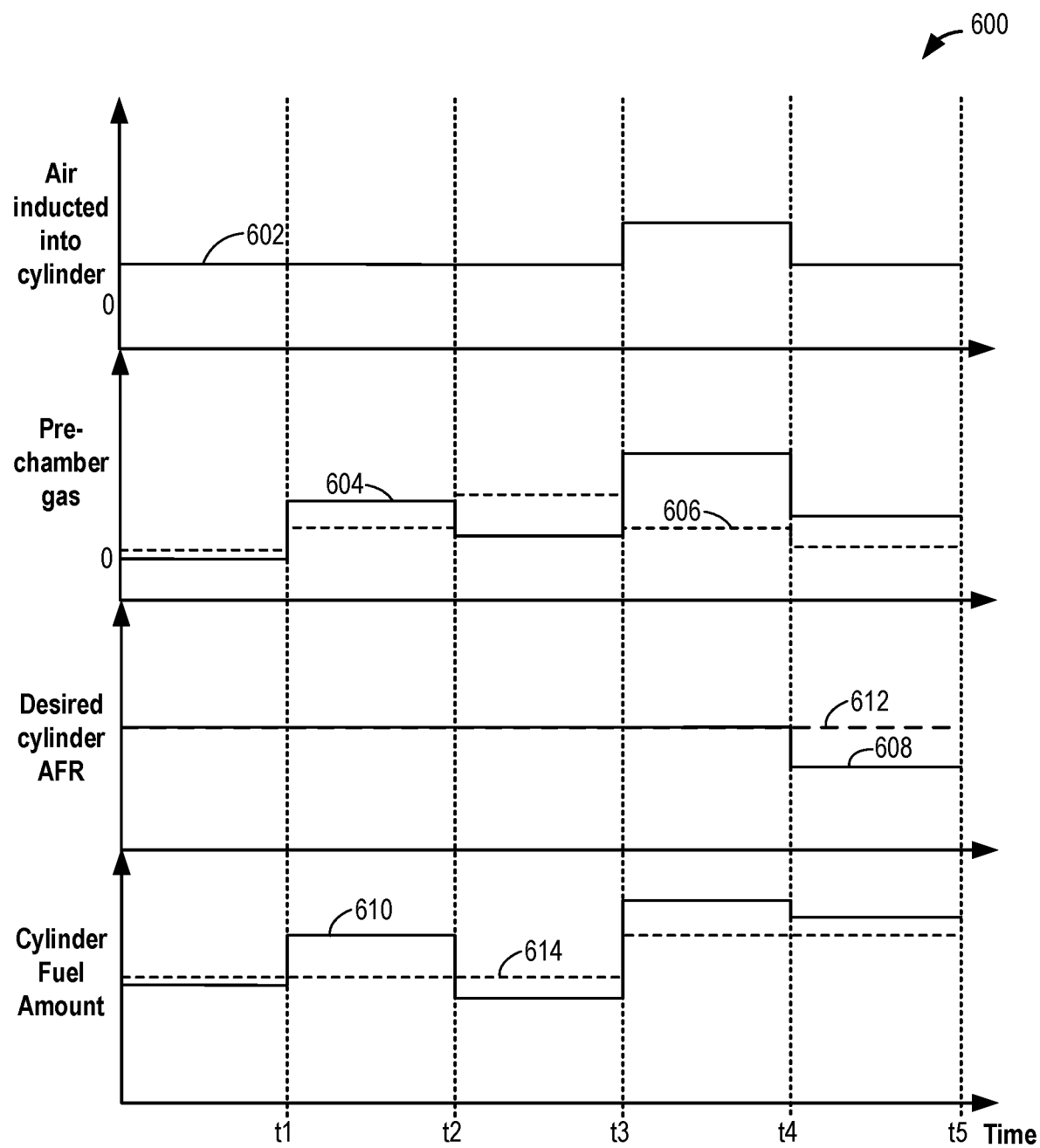
FIG. 6 shows a prophetic example timeline of operating a cylinder with different cylinder fueling amounts based on relative amounts of pre-chamber gases in the cylinder.

The following description relates to systems and methods for determining a fueling amount for a cylinder of a pre-chamber ignition engine. The cylinder may have a cylinder configuration including an active pre-chamber that includes a fuel injector, a spark plug, and an air and/or $O_2$ injector, such as shown in FIG. 1. The pre-chamber may be operated to provide an ignition source to the cylinder according to the method of FIG. 2. However, exhaust gases and injected air from the pre-chamber may enter the cylinder, which may change the air-fuel ratio (AFR) of the cylinder. Therefore, a controller of the engine may adjust cylinder fueling based on amounts of pre-chamber exhaust gas and air entering the cylinder during the compression stroke of the cylinder according to the example method of FIG. 3. FIG. 4 shows an example graph of a characteristic relationship between pressure in the cylinder and a piston position within the cylinder, which may be used by the controller to determine pre-chamber injection pressures as well as to estimate gas flow from the pre-chamber to the cylinder. Further, FIG. 5 shows an example timing diagram operating a pre-chamber to purge gases to a cylinder, and FIG. 6 shows an example timeline for operating a cylinder with cylinder fueling compensation based on amounts of pre-chamber gases.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via pedal position sensor 134), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151 and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion. Pre-chamber 138 is defined by pre-chamber walls 139 and includes a spark plug 92, an air injector 94, and a pre-chamber fuel injector 96. Air injector 94 is shown directly coupled to pre-chamber 138 for injecting air and/or oxygen into the pre-chamber. In some examples, air injector 94 is an electromagnetic (e.g., solenoid) injector. One or more of ambient air, oxygen, and another combustible gas may be delivered to air injector 94 from a pre-chamber air source 190. In some examples, air injector 94 is an electromagnetic (e.g., solenoid) injector, and may inject air and/or $O_2$ in proportion to a pulse-width of a signal APW received from controller 12 via pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine, which may be stored in a pressurized tank before injection. In other examples, pre-chamber air source 190 supplies air injector 94 with onboard-generated $O_2$, which may be stored in a pressurized tank before injection. For example, the pressurized tank of pre-chamber air source 190 may be maintained at a desired pressure by an associated pump. A pressure differential between the pressurized tank and the pre-chamber and an open time of air injector 94 (e.g., as determined by the pulse-width of the signal APW) may determine the mass of air or $O_2$ delivered to pre-chamber 138, for example.

Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130. In one example, the AFR in pre-chamber 138 may be richer (e.g., have a higher proportion of fuel) than the AFR in cylinder 130. In another example, the AFR in the pre-chamber may be the same as the AFR in the cylinder. In yet another example, the AFR in pre-chamber 138 may be leaner (e.g., have a higher proportion of air) than the AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be exhausted from cylinder 130 to exhaust manifold 48 via opening of exhaust valve 8.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 2 and 3.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2:
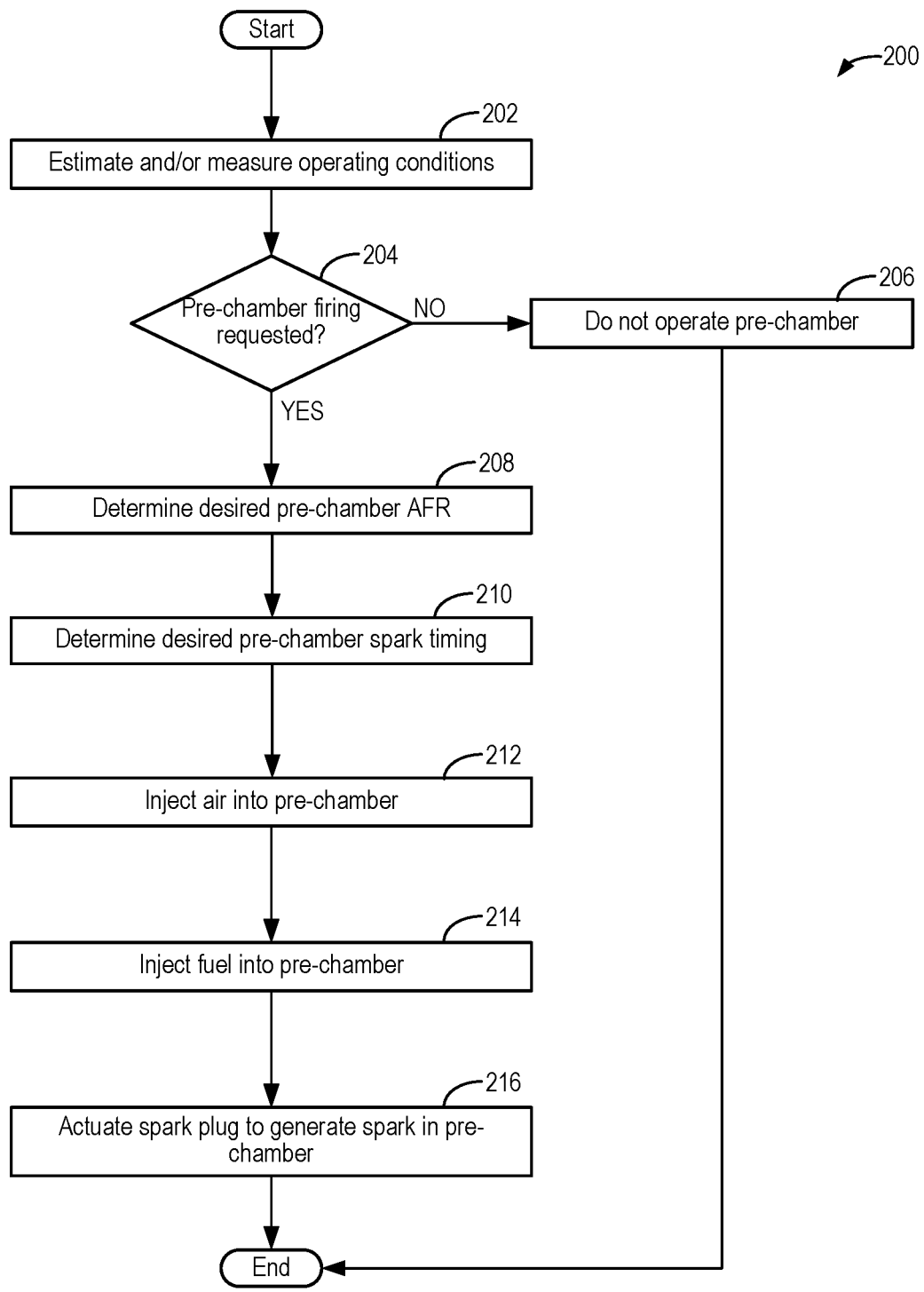
FIG. 2 shows an example method for operating a pre-chamber of a pre-chamber ignition system.

Next, FIG. 2 shows an example method for operating a pre-chamber of an engine to combust an air-fuel mixture within the pre-chamber. As one example, operating the pre-chamber provides an ignition source for a cylinder of the engine. As another example, operating the pre-chamber increases a temperature of the pre-chamber. Method 200 will be described with respect to engine 10 and the cylinder configuration shown in FIG. 1, although method 200 may be applied in other systems that include a pre-chamber with a spark plug, a fuel injector, and an air/O$_2$ injector. Further, method 200 will be described for one pre-chamber and cylinder pair, although it may be understood that method 200 may be simultaneously and/or sequentially executed for every cylinder of the engine. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the pre-chamber ignition system, including a pre-chamber fuel injector (e.g., pre-chamber fuel injector 96 of FIG. 1), a pre-chamber spark plug (e.g., pre-chamber spark plug 92 of FIG. 1), and a pre-chamber air injector (e.g., pre-chamber air injector 94 shown in FIG. 1) to adjust engine operation according to the methods described below.

At 202, method 200 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 204, method 200 includes determining whether a firing event is requested in the pre-chamber. In some examples, the pre-chamber firing event may be requested during nominal engine operation to provide an ignition source for the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. In alternative examples, the combustion cycle may refer to a two stroke movement of the piston. When the pre-chamber firing event is requested to provide an ignition source for the cylinder during a combustion cycle, the firing event may occur during the end of a compression stroke. In another example, the pre-chamber firing event may be requested during an exhaust stroke of a combustion cycle to increase a temperature of the pre-chamber.

If the pre-chamber firing event is not requested at 204, method 200 proceeds to 206, and includes not operating the pre-chamber. In some examples, the pre-chamber firing event may not be requested while engine combustion is discontinued. For example, engine combustion may be discontinued while the engine is shut down or during a fuel-cut condition, such as when cylinder fueling is shut off while the vehicle speed decreases. In another example, the pre-chamber firing event may not be requested when the pre-chamber firing event has already been performed during the combustion cycle. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber. Further, because combustion is not performed in the pre-chamber, not operating the pre-chamber may further include not providing an ignition source to the cylinder. However, in other examples, an alternative ignition source may be provided to the cylinder (e.g., via a cylinder spark plug that is independent from the pre-chamber spark plug or via compression ignition). In one example, the controller may adjust the pulse-widths of actuation signals to the fuel injector and the air injector such that no air-fuel mixture is injected into the pre-chamber. For example, no actuation signal may be sent to each of the fuel injector and the air injector. Further, the controller may adjust a control signal to the ignition system of the engine such that the spark plug in the pre-chamber is not activated.

If a pre-chamber firing event is requested at 204, method 200 proceeds to 208 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine temperature and fuel composition, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry.

At 210, method 200 includes determining a desired pre-chamber spark timing for the pre-chamber firing event. Determining the desired pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. As another example, if the engine is borderline limited and is unable to operate at MBT timing, engine knock control may advance or retard the pre-chamber spark timing to operate the engine at the borderline limit. In one example, the controller may input one or more engine operating conditions (e.g., engine speed, engine load, the exhaust gas temperature, a borderline knock limit, and cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions.

At 212, method 200 includes injecting air into the pre-chamber. In some examples, the air injected may be ambient air from an intake manifold of the engine, while in other examples, the pre-chamber air injector may provide onboard-generated $O_2$ or another combustible gas such as $H_2$. As one example, a single air injection event may not only provide air for combustion, but may also purge residual gases from a previous pre-chamber firing event from the pre-chamber. In another example, a single air injection may provide air for combustion without purging a significant amount of residual gas from the pre-chamber. As another example, a first air injection event may purge residual gases from the previous pre-chamber firing event from the pre-chamber, and a second air injection event may provide air for combustion in the pre-chamber. In yet another example, a third air injection may provide additional air for combustion in the pre-chamber, or may provide an alternative combustible gas (e.g., $H_2$) to the pre-chamber. For each of one or more injection events, the controller may adjust an amount of air injected into the pre-chamber based on the desired AFR of the pre-chamber, as determined at 208, and the position of the piston in the cylinder. For example, the controller may input the engine operating conditions, including the piston position and the desired AFR of the pre-chamber, into a look-up table, algorithm, or map, which may output a desired air injection amount. In some examples, the air injection amount may be held substantially constant while only the fuel injection amount is varied to compensate for changes in the desired AFR. For example, an amount of air injected may be approximately equal to a volume in the pre-chamber.

After determining the amount of air to be injected, the controller may inject the desired air amount by adjusting the pulse-width of an actuation signal sent to the pre-chamber air injector. Further, an injection pressure may be above a peak pressure in the cylinder. Because of this, some of the air injected may flow into the cylinder (e.g., due to the pressure in the cylinder being lower than the pressure in the pre-chamber). An amount of air injected to the pre-chamber that flows into the cylinder may be determined based on a pressure difference between the air injector pressure and the pressure in the cylinder and a size of opening(s) in the pre-chamber walls. This value may be used in adjusting cylinder fuel control, as will be elaborated with respect to FIG. 3.

At 214, method 200 includes injecting fuel into the pre-chamber. The controller may adjust an amount of fuel injected into the pre-chamber based on the desired AFR of the pre-chamber, as determined at 208, and the amount of air injected at 212. For example, the controller may input the desired pre-chamber AFR into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with the injected air (e.g., injected at 212) to form an air-fuel mixture.

At 216, method 200 includes actuating the pre-chamber spark plug to generate a spark in the pre-chamber. The controller may generate a control signal (e.g., signal SA) that is sent an ignition system (e.g., ignition system 88 of FIG. 1) to actuate the pre-chamber spark plug at the pre-chamber spark timing determined at 210. Generating the spark in the pre-chamber may cause the air-fuel mixture in the pre-chamber to combust, sending jets of hot gas and flame into the cylinder via a plurality of holes in the pre-chamber walls. When the cylinder also includes a combustible air-fuel mixture, the jets of hot gas and flame ignite the air-fuel mixture in the cylinder. After 216, method 200 may end.

In this way, the pre-chamber of a cylinder may be operated to ignite a first air-fuel mixture within the pre-chamber, which may further ignite a second air-fuel mixture in the cylinder. In some examples, method 200 may run continuously during nominal engine operation in order to continuously provide a cylinder ignition source when indicated. With active air and fuel injection in the pre-chamber, the AFR of the first air-fuel mixture may be predicted based on injection amounts of the air and fuel, which may increase ignition control, and active air injection may further purge the pre-chamber of residual gases from previous combustion cycles, for example. Further, with jets of flame and hot gas as the cylinder ignition source, the second air-fuel mixture in the cylinder may combust more fully and with a lower peak combustion temperature than in an engine with a spark plug as the cylinder ignition source. Thus, in a pre-chamber ignition system, the second air-fuel mixture in the cylinder may be commanded lean relative to stoichiometry without a reduction in combustion stability and without an increase in $NO_x$ emissions and/or combustion temperatures. Further, active air injection may further purge the pre-chamber of residual gases from previous cylinder cycles, for example. Accordingly, actively injecting both air and fuel into the pre-chamber increases a control and an accuracy of the AFR of the first air-fuel mixture compared with passive pre-chamber systems (e.g., pre-chamber systems without active air injection and/or active fuel injection). As a result, the pre-chamber may reliably operate over a wider range of engine operating conditions to provide cylinder ignition.

However, in active pre-chamber ignition systems, such as the cylinder configuration shown in FIG. 1, pre-chamber gases may enter the corresponding cylinder prior to cylinder combustion, which may change the AFR of the second air-fuel mixture (e.g., the AFR in the cylinder). Pre-chamber gases may include air injected into the pre-chamber and residual gases (e.g., exhaust gases from a previous combustion cycle) purged from the pre-chamber. For example, a fraction of air injected into the pre-chamber may flow into the corresponding cylinder before cylinder combustion. As another example, the pre-chamber residual gases may flow into the cylinder before cylinder combustion. The addition of such pre-chamber gases to the cylinder may cause the cylinder to operate at a different AFR than the commanded AFR. For example, if pre-chamber air (e.g., air injected into the pre-chamber) enters the cylinder before cylinder combustion, the cylinder AFR may be leaner (e.g., have a higher ratio of air to fuel) than commanded. As another example, if fuel-rich residual gases are purged into the cylinder prior to cylinder combustion, the overall cylinder AFR may be richer (e.g., have a lower ratio of air to fuel) than commanded. Such AFR deviations (e.g., uncommanded lean operation and/or uncommanded rich operation) may increase vehicle emissions, for example. Methods for determining cylinder fueling that compensate for the addition of pre-chamber gases to the cylinder are desired in order to reduce fueling errors in the cylinder.

Figure 3:
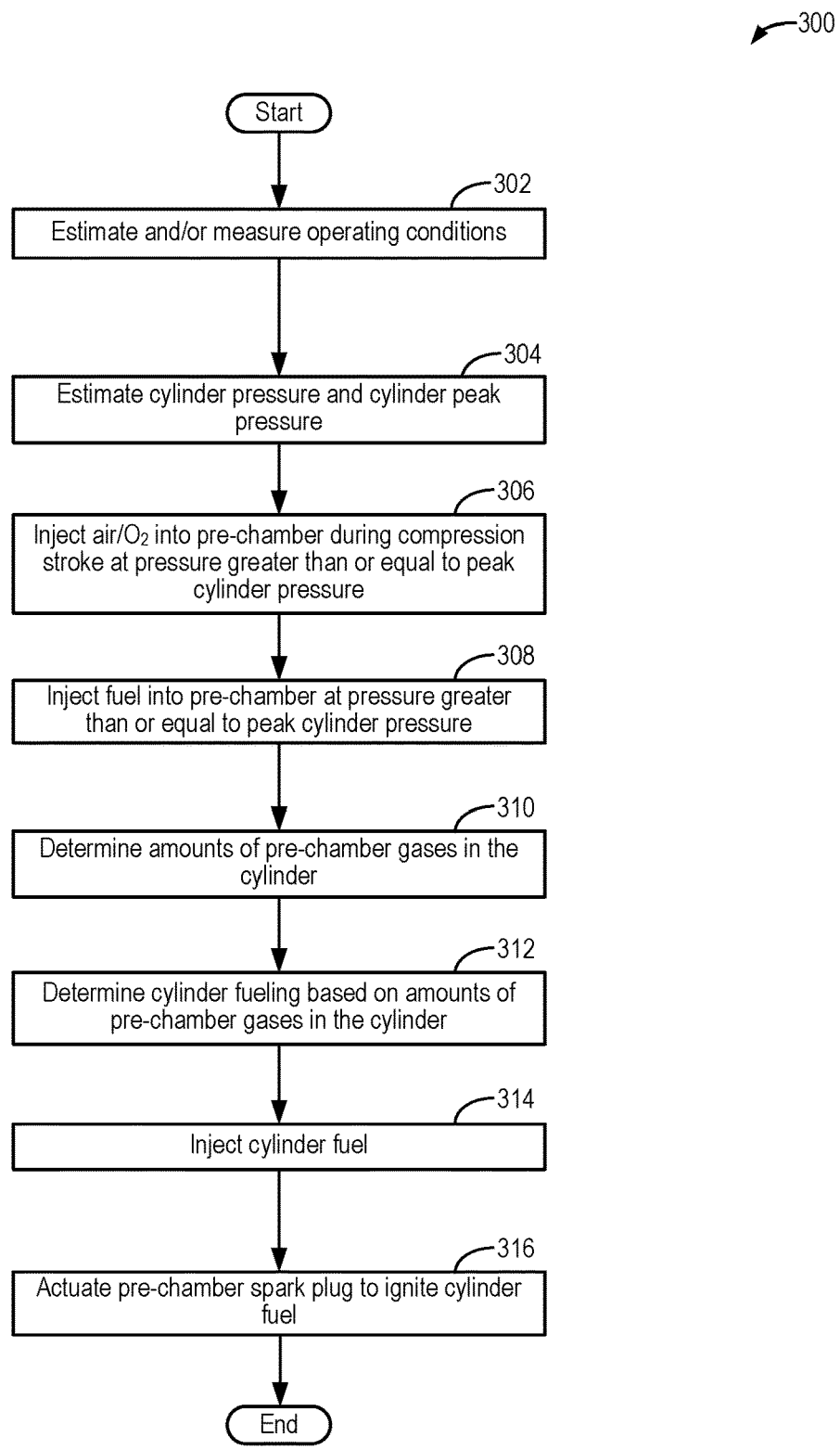
FIG. 3 shows an example method for determining cylinder fueling based on pre-chamber purge and pre-chamber air injection.

Thus, FIG. 3 shows an example method for adjusting cylinder fueling based on amounts of pre-chamber gases in a cylinder before pre-chamber combustion (e.g., cylinder fuel compensation). As illustrated in FIG. 1, the cylinder may include a cylinder fuel injector (e.g., cylinder fuel injector 66), which may inject fuel into the cylinder, and a pre-chamber located in a clearance volume of the cylinder. The pre-chamber and may include a pre-chamber fuel injector (e.g., fuel injector 96 of FIG. 1), an air injector (e.g., air injector 94 of FIG. 1), and a spark plug (e.g., spark plug 92 of FIG. 1). As such, method 300 will be described with respect to the cylinder configuration shown in FIG. 1, although method 300 may be applied in other systems that include pre-chamber ignition. Instructions for carrying out method 300 may be executed by a controller, such as controller 12 of FIG. 1, based on instructions stored on a memory of the controller and in conjunction with signal received from sensors of the engine system, such as the sensors described above with reference to FIG. 1. The controller may employ engine actuators of the engine system to adjust cylinder fueling according to the method described below. Method 300 will be described with respect to a single cylinder including a pre-chamber, although method 300 may be performed simultaneously for a plurality of cylinders in a multi-cylinder engine with pre-chamber ignition.

At 302, method 300 includes estimating and/or measuring operating conditions. The operating conditions may include, for example, vehicle speed, engine speed, engine load, an exhaust gas AFR, absolute manifold pressure, mass air flow, and throttle position. The operating conditions may be measured by one or more sensors communicatively coupled to the controller or may be inferred based on available data. For example, the exhaust gas AFR may be determined based on a measurement from an exhaust gas oxygen sensor, such as exhaust gas oxygen sensor 128 of FIG. 1. As another example, the absolute manifold pressure may be measured by an absolute manifold pressure sensor, such as MAP sensor 122 of FIG. 1. As yet another example, the mass air flow may be measured by a mass air flow (MAF) sensor, such as MAF sensor 123 shown in FIG. 1. As another example, the controller may use output from a throttle position (TP) sensor to determine a position of the throttle.

At 304, method 300 includes estimating cylinder pressure, which includes a peak cylinder pressure. For example, the controller may estimate and/or determine a characteristic relationship between a cylinder pressure and a piston position. Turning briefly to FIG. 4, an example plot 400 of a characteristic relationship between a cylinder pressure and a piston position of the cylinder during a compression stroke and a power stroke of the cylinder is shown. For plot 400, the vertical axis shows cylinder pressure relative to an absolute manifold pressure. The horizontal axis shows piston position relative to top dead center (TDC) and bottom dead center (BDC) during the compression stroke and the power stroke of the cylinder.

Plot 400 includes a non-linear curve 402 that illustrates the relationship between the cylinder pressure and the piston position. A controller, such as controller 12 of FIG. 1, may estimate the cylinder pressure, including a peak cylinder pressure, based on the Ideal Gas Law, for example, which states a relationship between volume, pressure, and temperature for a closed container of a gas. Specifically, the Ideal Gas Law states that a pressure of the gas and a volume of the gas are inversely related. For example, when the piston position is at BDC, the cylinder volume is high, and so the relative cylinder pressure is low. As another example, when the piston position is at TDC (shown by a dashed line 416), the cylinder volume is low, and so the cylinder pressure is higher. Further, a peak cylinder pressure (e.g., $P_p$) may be achieved when the cylinder volume is the lowest at TDC. As used herein, the peak cylinder pressure is defined as the maximum air pressure in the cylinder based on cylinder volume and is shown by a dashed line 404. Although the cylinder pressure may further increase during combustion, combustion pressures are not represented by curve 402. Further, the peak cylinder pressure may vary according to engine operating conditions. As an example, the peak cylinder pressure may be lower in low load operating conditions relative to the peak cylinder pressure in high load operating conditions. That is, when the engine is operating with a more open throttle, more air enters the engine, resulting in a higher peak cylinder pressure during the compression stroke before ignition and combustion.

Returning to FIG. 3, thus, based on the characteristic relationship between piston position and cylinder pressure, the controller may estimate the pressure in the cylinder throughout a combustion cycle. In particular, air charge, which may be determined based on intake manifold pressure (e.g., MAP), will determine a mass of air in the cylinder, and then a relationship between the mass of air in the cylinder and a volume of the cylinder (e.g., the Ideal Gas Law) may be used to determine the cylinder pressure. For example, the volume of the cylinder throughout a combustion cycle may be estimated based on piston position, crank position, stroke, bore, and connecting rod length. As one example, the controller may input the current operating conditions, such as engine speed, engine temperature, and intake manifold pressure, into one or more look-up tables, functions, or maps, which may output the estimated cylinder pressure relative to piston position. Further, the controller may estimate the peak cylinder pressure by inputting the current engine operating conditions, such as engine speed, engine temperature, and intake manifold pressure, into one or more look-up tables, functions, or maps. In some examples, the controller may actively calculate the estimated cylinder pressure in real-time or at pre-determined intervals, including the peak cylinder pressure, while in other examples, the controller may access pre-determined estimations stored in look-up tables and/or maps in controller memory according to the engine operating conditions.

At 306, method 300 includes injecting air into the pre-chamber during the compression stroke at a pressure greater than or equal to the peak cylinder pressure during the compression stroke. Further, the air may be injected one or more times at the pressure higher than peak cylinder pressure for each injection event. For example, a first air injection may be a purge injection that pushes out pre-chamber exhaust gases, which may remain in the pre-chamber from a previous combustion cycle, and a second air injection may be provided for combustion. Returning to FIG. 4, the controller may perform said air injections during the compression stroke, with injection timing based on cylinder pressure. As a non-limiting example, plot 400 includes a purging region 406 between a piston position 410 and a piston position 412. In purging region 406, the controller may command air injection in the pre-chamber while pressure in the cylinder is low at piston position 410, which may encourage purging pre-chamber exhaust gases into the cylinder. As another non-limiting example, plot 400 includes an injection region 408 between piston position 412 and a piston position 414. In injection region 408, air may be injected into the pre-chamber according to the method of FIG. 2 to introduce air into the pre-chamber before pre-chamber combustion.

Returning to 306 of FIG. 3, the pressure of air injected into the pre-chamber during each of the first air injection and the second air injection may be determined by inputting engine operating conditions (e.g., engine load and engine temperature) and the peak cylinder pressure into one or more look-up tables, maps, or functions. Further, the air is injected into the pre-chamber at or above the peak cylinder pressure by actuating the air injector during the compression stroke, for example. For example, for each of the first air injection and the second air injection, the controller may adjust a pulse width of an actuation signal sent to the air injector in order to inject a determined amount of air (e.g., ambient air, $O_2$, or the like) into the pre-chamber at the determined air pressure. Injecting the first air injection at the pressure at or above peak cylinder pressure may promote purging of pre-chamber exhaust gas into the cylinder, for example. As another example, injecting the second air injection at or above peak cylinder pressure may increase mixing of air and fuel in the pre-chamber, which may increase ignitibility of a first air-fuel mixture (e.g., the air-fuel mixture in the pre-chamber). However, in some operating conditions, such as a fuel cut condition, a single air injection may be performed in order to decrease an amount of oxygen escaping the pre-chamber.

At 308, method 300 includes injecting fuel into the pre-chamber at a pressure greater than or equal to the peak cylinder pressure. Further, the pre-chamber fuel injection may be performed during the injection region 408 of FIG. 4 introduced above. Pre-chamber fuel injected at 308 may mix with pre-chamber air injected at 306, during the second air injection, for example, and may create the first air-fuel mixture. For example, a desired amount of fuel is injected into the pre-chamber by actuating the fuel injector during the compression stroke. The desired amount of fuel may be determined according to the method of FIG. 2. The pressure of fuel injected into the pre-chamber may be determined based on engine operating conditions by referring to one or more look-up tables, maps, or functions, and further may be calibrated to promote combustion stability. For example, the controller may adjust a pulse width of an actuation signal sent to the fuel injector to inject the desired amount of fuel into the pre-chamber at the determined fuel pressure. Injecting the fuel at or above peak cylinder pressure may promote flow into the pre-chamber, for example. As another example, injecting the fuel above peak cylinder pressure may increase mixing of air and fuel in the pre-chamber, which may increase ignitibility of the air-fuel mixture in the pre-chamber. By injecting air into the pre-chamber at 306 and injecting fuel into the pre-chamber at 308, the pre-chamber may be filled with the first air-fuel mixture.

At 310, method 300 includes determining amounts of pre-chamber gases in the cylinder. For example, after a pre-chamber combustion, jets of flame and hot gas enter the cylinder via a plurality of openings, but a portion of exhaust gas from the pre-chamber combustion remains in the pre-chamber until being purged into the cylinder via the purge injection described above at 306. Further, a portion of air injected via the purge injection may enter the cylinder prior to combustion. Further still, an amount of unburnt fuel may also escape the cylinder during the purge injection. Therefore, a composition of the pre-chamber gases in the cylinder may include a mixture of burnt exhaust gas from the previous combustion cycle, purging air, and unburnt fuel from the previous combustion cycle, and determining the amounts of the pre-chamber gases in the cylinder may include determining an amount of exhaust gas purged from the pre-chamber (or a proportion of the exhaust gas in a total amount of pre-chamber gases), an amount of air from the purge injection (or a proportion of air in the total amount of pre-chamber gases), and an amount of unburnt fuel purged from the pre-chamber (or a proportion of unburnt fuel in the total amount of pre-chamber gases). The amount of pre-chamber exhaust gas purged to the cylinder and the amount of pre-chamber air from the purge injection may be determined at least partially based on the pressure in the cylinder during the purge injection, for example. As another example, the amount of pre-chamber exhaust gas purged to the cylinder and the amount of pre-chamber air from the purge injection in the cylinder may be determined based on a pressure difference between the pre-chamber and the cylinder across the plurality of openings, or orifices, of the pre-chamber. For example, the controller may input the cylinder pressure during the purge injection and the pressure of the purge injection into one or more look-up tables, algorithms, or maps, which may output the amount of pre-chamber exhaust gas and/or the amount of pre-chamber air from the purge injection in the cylinder. As another example, the controller may estimate cylinder pressure during the pre-chamber air injection and may determine the amount of pre-chamber air in the cylinder by inputting the estimated cylinder pressure and pre-chamber injection amounts into one or more look-up tables, maps, or functions. The amount of pre-chamber air in the cylinder may be a fraction of the air injected into the pre-chamber for purging (e.g., during the purging region 406 of FIG. 4).

As another example, the amount of exhaust gases purged from the pre-chamber may be determined based on a volume of exhaust gases purged from the pre-chamber (e.g., during the purging region 406 of FIG. 4), which may be equal to a volume of the pre-chamber on the previous combustion cycle. Thus, in some examples, the amount of exhaust gases purged from the pre-chamber may be determined based on a known relationship between cylinder pressure, a geometry of the pre-chamber, and a geometry of the pre-chamber openings, by referring to one or more look-up tables, maps, or functions. For example, the controller may estimate cylinder pressure during pre-chamber exhaust gas purging and may determine the amount of exhaust gas by inputting the estimated cylinder pressure into one or more look-up tables, maps, or functions. As another example, the amount of unburnt fuel from the pre-chamber in the cylinder may be determined by inputting a fuel injection pressure, a fuel injection amount, and a spark timing from the previous combustion cycle into one or more look-up tables, maps, or functions.

At 312, method 300 includes determining cylinder fueling based on the amounts of pre-chamber gases in the cylinder. Specifically, determining cylinder fueling may include determining an amount of fuel for injection in the cylinder in order to operate the cylinder a desired AFR. The desired AFR for the cylinder may be stoichiometry, for example. In other examples, the desired AFR for the cylinder may be lower (e.g., richer) or higher (e.g., leaner) than stoichiometry. The controller may determine the amount of fuel for injection in the cylinder based on the desired AFR, the amounts of pre-chamber gases in the cylinder, and an amount of air inducted into the cylinder during the intake stroke. For example, the amount of fuel for injection in the cylinder may be equal to the air mass inducted into the cylinder, added to the amount of air purged from the pre-chamber, less the amount of exhaust gas purged from the pre-chamber, less the amount of unburnt fuel purged from the pre-chamber. In one example, when the controller determines that additional purging air is in the cylinder, it may increase the cylinder fueling amount in order to maintain stoichiometry in the cylinder. In another example, when the controller determines that additional fuel-rich residual gases are in the cylinder, it may decrease the cylinder fueling amount in order to maintain stoichiometry in the cylinder. Although air and fuel from the second air-fuel mixture may escape into the pre-chamber during the injection region 408 of FIG. 4, such leakage may be considered stoichiometric, for example, and may not be compensated for in the cylinder fuel adjustment. The controller may determine the amount of air inducted during the intake stroke based on output from one or more of the MAP sensor, the throttle position sensor, and the MAF sensor, combined with an intake valve opening time, by referring to one or more look-up tables, maps, or functions. Further, in cylinder configurations with external EGR, such as the cylinder configuration of FIG. 1, the controller may adjust the determined cylinder fueling based on an amount of EGR flowing into the cylinder and an AFR of the EGR by referring to one or more look-up tables, graphs, or functions.

At 314, method 300 includes injecting fuel into the cylinder. For example, fuel is injected into the cylinder by actuating the cylinder fuel injector during the compression stroke. For example, the controller may adjust a pulse width of an actuation signal sent to the cylinder fuel injector to inject the determined amount of fuel (e.g., as determined at 312) into the cylinder during the compression stroke. In some examples, the determined amount of fuel may be injected in a single injection event, while in other examples, the determined amount of fuel may be distributed over a plurality of injection events.

At 316, method 300 includes actuating the pre-chamber spark plug to ignite the cylinder fuel. The spark ignites the first air-fuel mixture inside the pre-chamber, causing a combustion reaction that then ignites the second air-fuel mixture in the cylinder. For example, the controller may actuate the spark plug via a spark advance signal (e.g., signal SA shown in FIG. 1). In some examples, the controller may further determine a spark timing based on the relationship between cylinder pressure and piston position by referring to one or more look-up tables, maps, or functions. For example, the controller may actuate the pre-chamber spark plug at a desired piston position for combustion in the cylinder. As a non-limiting example, the pre-chamber spark plug may be actuated at a piston position before TDC (shown by dashed line 416 in FIG. 4). Method 300 then ends. For example, method 300 may be repeated during each combustion cycle to actively manage cylinder fueling.

In this way, a cylinder with a pre-chamber ignition system may be operated to provide torque to an engine by combusting an air-fuel mixture, and cylinder fueling may be adjusted to compensate for the pre-chamber gases. Further, the cylinder fueling may be adjusted based on both an amount and composition of the pre-chamber gases in the cylinder. For example, as an amount and/or proportion of unburnt fuel from the pre-chamber gases increases, the cylinder fueling may be further decreased. As another example, as an amount and/or proportion of combustion gases from the pre-chamber increases, the cylinder fueling may be further increased. As still another example, as an amount and/or proportion of air from the pre-chamber increases, the cylinder fueling may be further increased. As a result, an accuracy of the cylinder fueling may be increased and a desired AFR of the cylinder may be more accurately achieved. By accurately controlling the AFR of the cylinder, an efficiency of an emission control device may be increased, thereby increasing vehicle emissions. Further, fuel vehicle fuel efficiency may be increased by not inadvertently operating the cylinder rich.

Turning now to FIG. 5, an exemplary timing chart 500 of operating a cylinder with pre-chamber ignition, including pre-chamber purging, is shown. The cylinder may be cylinder 130 of engine 10 in FIG. 1, for example, and may include a pre-chamber ignition system (e.g., pre-chamber 138 of FIG. 1). Timing chart 500 shows one combustion cycle, wherein the combustion cycle (e.g., a cylinder cycle) refers to four strokes of an engine cycle within a cylinder. A piston position relative to top dead center (TDC), bottom dead center (BDC), and the four strokes of the combustion cycle (intake, compression, power, and exhaust) is shown in plot 502. Further, a pre-chamber fuel injection signal is shown in plot 504, a pre-chamber air injection signal is shown in plot 506, an intake valve lift is shown in plot 508, an exhaust valve lift is shown in dashed plot 510, and a cylinder fuel injection signal is shown in plot 512. For all of the above, the horizontal axis represents engine position (e.g., in crank angle degrees), with the crank angle degrees (CAD) increasing from left to right. The vertical axis represents each labeled parameter. For plot 502, the vertical axis shows piston position relative to TDC. For each of the plots 504, 506, and 512, an increase in magnitude of the parameter above zero indicates actuation of the corresponding injector. For plots 508 and 510, the lift of the corresponding valve increases up the vertical axis from zero. Further, the stroke of the combustion cycle is indicated at the top of timing chart 500. The power stroke corresponds to an interval from 0 CAD to 180 CAD, the exhaust stroke corresponds to an interval from 180 CAD to 360 CAD, the intake stroke corresponds to an interval from 360 CAD to 540 CAD, and the compression stroke corresponds to an interval from 540 CAD to 720 CAD.

Just prior to the start of the intake stroke (e.g., around 350 CAD), the intake valve is opened (plot 508). As shown in timing chart 500, an exhaust valve open duration may overlap with an intake valve open duration, in some examples. For example, after the start of the intake stroke (e.g., around 380 CAD), the exhaust valve is closed (dashed plot 510), resulting in positive valve overlap between the intake valve and the exhaust valve. During the intake stroke, air is introduced into the cylinder via the intake valve as the piston (plot 502) moves toward BDC, which is the point at which the piston is at its bottom-most position in the cylinder and at the end of the intake stroke (e.g., when the combustion chamber is at its largest volume).

At the beginning of the compression stroke (e.g., around 540 CAD), the intake valve closes (plot 508). The piston (plot 502) moves toward the cylinder head so as to compress the air within the cylinder. The point at which the piston is at the end of its stroke and closest to the cylinder head (e.g., when the combustion chamber is at its smallest volume) is typically referred to as TDC. During the compression stroke, as the piston (plot 502) moves toward TDC, a series of injection events may introduce an air-fuel mixture into the pre-chamber. In the example of FIG. 5, a first air injection event introduces pre-chamber air (plot 506) into the pre-chamber while the piston position (plot 502) is relatively low (e.g., while cylinder pressure is relatively low). Next, a second air injection event introduces pre-chamber air (plot 506) into the pre-chamber for combustion while the piston position (plot 502) is higher than the piston position of the first air injection. Next, as the piston position further increases, a fuel injection event introduces pre-chamber fuel (plot 504) into the pre-chamber, which may create an air-fuel mixture in the pre-chamber. In order to introduce an air-fuel mixture in the cylinder, a cylinder fuel injection event introduces an amount of cylinder fuel (plot 512) into the cylinder before pre-chamber combustion begins at the end of the compression stroke (e.g., just before 720 CAD).

As elaborated in the method of FIG. 3, the amount of cylinder fuel (plot 512) introduced into the cylinder at the end of the compression stroke may be based on an amount of pre-chamber gases in the cylinder at the end of the compression stroke. For example, a controller may increase the amount of cylinder fuel to compensate for escaped air from the pre-chamber. In another example, the controller may decrease the amount of cylinder fuel to compensate for residual combustion gases purged from the pre-chamber.

Thus, FIG. 6 shows an exemplary timeline of operating a cylinder in order to adjust an amount of cylinder fuel based on amounts of pre-chamber gases according to the method of FIG. 3. The engine may be engine 10 shown in FIG. 1, for example, and controlled by controller 12. An amount of air inducted into the cylinder is shown in plot 602, an amount of escaped purge air (e.g., air injected during purging region 406 of FIG. 4 that escapes to the cylinder) is shown in plot 604, an amount of purged pre-chamber exhaust is shown in dashed plot 606, a desired cylinder AFR is shown in plot 608, and a compensated cylinder fuel amount is shown in plot 610. Further, a stoichiometric AFR is shown by dashed line 612, and an uncompensated cylinder fuel amount is shown in dashed plot 614. The uncompensated cylinder fuel amount may represent a cylinder fuel amount without any correction for pre-chamber gases in the cylinder. For all of the above, the horizontal axis represents time, with time increasing along the horizontal axis from left to right. The vertical axis represents each labeled parameter. For plots 602, 604, 606, 608, 610, and 612, a magnitude of the parameter increases up the vertical axis from top to bottom.

Prior to time t1, the cylinder operates without a purge injection in the pre-chamber. As an example, air may be injected into the pre-chamber only to introduce an air-fuel mixture into the pre-chamber (e.g., during the injection region 408 of FIG. 4). Thus, prior to t1, the amount of escaped purge air (plot 604) is zero, the amount of purged pre-chamber exhaust (dashed plot 606) is small, and the compensated cylinder fuel amount (plot 610) is slightly decreased relative to the uncompensated cylinder fuel amount (dashed plot 614). Because the desired AFR (plot 608) is stoichiometry (shown by dashed line 612), the cylinder fuel amount may be a small amount less than the amount of air inducted into the cylinder (plot 602).

At time t1, the cylinder begins operating with purge injections in the pre-chamber, such as shown in FIG. 5, while the desired cylinder AFR (plot 608) remains at stoichiometry (dashed line 614) and the amount of air inducted into the cylinder (plot 602) remains constant. For example, during each combustion cycle after time t1, a first air injection introduces purge air into the pre-chamber (e.g., during the purging region 406 of FIG. 4). Further, due to the injection of purge air in the pre-chamber, residual pre-chamber exhaust gases from a previous combustion cycle are purged from the pre-chamber into the cylinder. In the example of FIG. 6, the purged pre-chamber exhaust is assumed to be fuel-rich. However, in other examples, the purged pre-chamber residual gases may be stoichiometric, and in still other examples, the purged pre-chamber residual gases may be lean relative to stoichiometry. Further, at time t1, the amount of escaped purge air (plot 604) at time t1 is higher than the amount of purged pre-chamber exhaust (dashed plot 606) at time t1. Thus, a composition of the pre-chamber gases includes a higher proportion of escaped purge air than purged pre-chamber exhaust. In response to the amount of escaped purge air (plot 604) being higher than the amount of purged pre-chamber exhaust, the compensated cylinder fuel amount (plot 610) increases relative to the uncompensated cylinder fuel amount (dashed plot 614).

At time t2, the cylinder continues operating with purge injections in the pre-chamber, while the desired cylinder AFR (plot 608) remains at stoichiometry (dashed line 614) and the amount of air inducted into the cylinder (plot 602) remains constant. Further, due to the injection of purging air in the pre-chamber, residual pre-chamber exhaust gases are purged from the pre-chamber into the cylinder. However, at t2, the amount of escaped purge air (plot 604) is lower than the amount of purged pre-chamber exhaust (dashed plot 606). That is, the composition of the pre-chamber gases includes a higher proportion of purged pre-chamber exhaust than escaped purge air. In response to the amount of escaped purge air (plot 604) being lower than the amount of purged pre-chamber exhaust, the compensated cylinder fuel amount (plot 610) decreases relative to the uncompensated cylinder fuel amount (dashed plot 614).

At time t3, the cylinder continues operating with purge injections in the pre-chamber, while the desired cylinder AFR (plot 608) remains at stoichiometry (dashed line 614) and the amount of air inducted into the cylinder (plot 602) increases relative to the amount of air inducted into the cylinder before time t3. For example, the amount of air inducted into the cylinder (plot 602) may increase in response to a change in throttle position or a change in intake manifold pressure. However, at time t3, the amount of escaped purge air (plot 604) is higher than the amount of purged pre-chamber exhaust (dashed plot 606), and so the composition of the pre-chamber gases includes a higher proportion of escaped purge air than purged pre-chamber exhaust. In response to the amount of escaped purge air (plot 604) being higher than the amount of purged pre-chamber exhaust, and the amount of air inducted into the cylinder (plot 602) increasing, the compensated cylinder fuel amount (plot 610) further increases relative to the uncompensated cylinder fuel amount (dashed plot 614). In particular, the compensated cylinder fuel amount (plot 610) is higher than the uncompensated cylinder fuel amount (dashed plot 614) due to the additional air in the cylinder, both from amount of escaped purge air (plot 604) and from the amount of air inducted into the cylinder (plot 602).

At time t4, the cylinder continues operating with purge injections in the pre-chamber, while the amount of air inducted into the cylinder (plot 602) decreases and returns to the amount of air inducted into the cylinder at t1. However, the desired AFR (plot 608) decreases relative to stoichiometry (dashed line 612) at time t4. Thus, the cylinder begins operating with a rich AFR at time t4. At time t4, the amount of escaped purge air (plot 604) is higher than the amount of purged pre-chamber exhaust (dashed plot 606). Thus, the composition of the pre-chamber gases includes a higher proportion of escaped purge air than purged pre-chamber exhaust. In response to the amount of escaped purge air (plot 604) being higher than the amount of purged pre-chamber exhaust, and the desired cylinder AFR (plot 508) decreasing relative to stoichiometry (dashed line 512), the compensated cylinder fuel amount (plot 610) increases relative to the uncompensated cylinder fuel amount (dashed plot 614). In particular, the compensated cylinder fuel amount (plot 610) is higher than the uncompensated cylinder fuel amount (dashed plot 614) due to both the additional air in the cylinder and the decreased (e.g., enriched) desired cylinder AFR (plot 608).

In this way, a cylinder with a pre-chamber ignition system may be operated to provide torque to an engine by combusting an air-fuel mixture, and a cylinder fuel amount may be adjusted to compensate for pre-chamber gases in the cylinder prior to combustion. For example, a controller may determine amounts of pre-chamber gases, including air and residual exhaust gas, based on a pressure in the cylinder and geometric properties of the pre-chamber. Further, the controller may determine the cylinder fuel amount based on an amount of purge air, an amount of purged exhaust gas from the pre-chamber, and an amount of air inducted into the cylinder. As a result, the cylinder fuel amount is compensated for the pre-chamber gases in order to achieve a desired AFR in the cylinder. Adjusting cylinder fueling for pre-chamber gases may increase a fuel efficiency of the cylinder and may increase a combustion stability of the cylinder. Overall, compensating cylinder fueling for amounts of pre-chamber gases in the cylinder may increase customer satisfaction relative to engine systems with uncompensated cylinder fueling.

The technical effect of adjusting cylinder fueling based on amounts of pre-chamber gases in the cylinder is that a desired air-fuel ratio may be more accurately achieved in the cylinder, thereby decreasing vehicle emissions that may otherwise result from inaccurate air-fuel ratio control.

As one example, a method comprises: adjusting a fuel injection amount to a cylinder based on an amount of pre-chamber gases in the cylinder during a compression stroke of the cylinder. In the preceding example, additionally or optionally, the pre-chamber gases flow to the cylinder from a pre-chamber coupled to the cylinder via an opening in walls of the pre-chamber. In one or both of the preceding examples, additionally or optionally, the amount of pre-chamber gases is determined based on a pressure difference between the pre-chamber and the cylinder. In any or all of the preceding examples, additionally or optionally, the pressure difference between the pre-chamber and the cylinder is determined based on an injection pressure of the pre-chamber and a position of a piston within the cylinder. In any or all of the preceding examples, additionally or optionally, the injection pressure of the pre-chamber is greater than or equal to a peak pressure of the cylinder. In any or all of the preceding examples, additionally or optionally, the amount of pre-chamber gases includes one or more of an amount of pre-chamber air, an amount of pre-chamber fuel, and an amount of pre-chamber combustion gases from a previous combustion cycle. In any or all of the preceding examples, additionally or optionally, adjusting the fuel injection amount to the cylinder includes increasing the fuel injection amount to the cylinder as the amount of pre-chamber air in the cylinder during the compression stroke increases. In any or all of the preceding examples, additionally or optionally, adjusting the fuel injection amount to the cylinder includes decreasing the fuel injection amount to the cylinder as the amount of pre-chamber fuel in the cylinder during the compression stroke increases. In any or all of the preceding examples, additionally or optionally, adjusting the fuel injection amount to the cylinder includes decreasing the fuel injection amount to the cylinder as the amount of pre-chamber combustion gases from the previous combustion cycle in the cylinder during the compression stroke increases. In any or all of the preceding examples, additionally or optionally, adjusting the fuel injection amount to the cylinder is further based on an amount of air inducted into the cylinder through an intake valve of the cylinder.

As another example, a method comprises: determining an amount of gases purged from a pre-chamber to a cylinder based on a pressure difference between the pre-chamber and the cylinder during purging; and adjusting fueling to the cylinder based on the amount of gases purged from the pre-chamber to the cylinder. In the preceding example, the method additionally or optionally further comprises determining a composition of the gases purged from the pre-chamber to the cylinder based in part on parameters of a previous pre-chamber combustion event, and the purging includes actuating an air injector of the pre-chamber during a compression stroke of the cylinder. In one or both of the preceding examples, additionally or optionally, the composition includes at least one of pre-chamber air, pre-chamber fuel, and pre-chamber exhaust gas, and adjusting the fueling to the cylinder includes: increasing the fueling to the cylinder as an amount of pre-chamber air increases; decreasing the fueling to the cylinder as an amount of pre-chamber fuel increases; and decreasing the fueling to the cylinder as an amount of pre-chamber exhaust gas increases. In any or all of the preceding examples, additionally or optionally, the parameters of the previous pre-chamber combustion event include a pre-chamber fuel injection pressure, a pre-chamber fuel injection amount, a pre-chamber air injection pressure, a pre-chamber air injection amount, and a pre-chamber spark timing. In any or all of the preceding examples, additionally or optionally, the pressure difference between the pre-chamber and the cylinder during the purging is determined based on an injection pressure of an air injector of the pre-chamber and a piston position of the cylinder, and the injection pressure of the air injector is at least equal to a peak pressure of the cylinder.

As another example, a system comprises: an engine including a plurality of cylinders, each cylinder including a cylinder fuel injector and a pre-chamber of a pre-chamber ignition system; and a controller storing executable instructions in non-transitory memory that, when executed, cause the controller to: purge gases from the pre-chamber to the corresponding cylinder; and adjust a fuel injection amount of the cylinder fuel injector based on an amount and composition of the gases purged from the pre-chamber. In the preceding example, additionally or optionally, the pre-chamber includes an air injector, a pre-chamber fuel injector, and a spark plug, and the composition of the gases purged from the pre-chamber includes at least one of air, fuel, and exhaust gas from a previous combustion in the pre-chamber. In one or both of the preceding examples, additionally or optionally, to adjust the fuel injection amount of the cylinder fuel injector based on the amount and composition of the gases, the controller includes further instructions stored in non-transitory memory that, when executed, cause the controller to: increase the fuel injection amount of the cylinder fuel injector as a proportion of air in the gases purged from the pre-chamber increases; decrease the fuel injection amount of the cylinder fuel injector as a proportion of fuel in the gases purged from the pre-chamber increases; and decrease the fuel injection amount of the cylinder fuel injector as a proportion of exhaust gas from the previous combustion in the pre-chamber in the gases purged from the pre-chamber increases. In any or all of the preceding examples, additionally or optionally, to purge gases from the pre-chamber to the corresponding cylinder, the controller includes further instructions stored in non-transitory memory that, when executed, cause the controller to: actuate the air injector during a compression stroke of the cylinder at an injection pressure at or above a peak pressure of the cylinder. In any or all of the preceding examples, additionally or optionally, the controller includes further instructions stored in non-transitory memory that, when executed, cause the controller to: determine the peak pressure of the cylinder based on at least a temperature of the engine and engine load.

As another representation, a method comprises: adjusting an injection pressure of a one or more pre-chamber injectors based on a peak pressure of a cylinder during a compression stroke of the cylinder. In the preceding example, additionally or optionally, the one or more pre-chamber injectors include an air injector, and adjusting the injection pressure includes increasing the injection pressure of the air injector above the peak pressure of the cylinder. In one or both of the preceding examples, additionally or optionally, the one or more pre-chamber injectors include a pre-chamber fuel injector, and adjusting the injection pressure includes increasing the injection pressure of the pre-chamber fuel injector above the peak pressure of the cylinder. In any or all of the preceding examples, additionally or optionally, the peak pressure of the cylinder is determined based on an amount of air in the cylinder during the compression stroke and a volume of the cylinder when a piston within the cylinder reaches top dead center of the compression stroke. In any or all of the preceding examples, additionally or optionally, the amount of air in the cylinder is determined based on an intake manifold pressure. In any or all of the preceding examples, additionally or optionally, the amount of air in the cylinder is determined based on a throttle position. In any or all of the preceding examples, the method additionally or optionally further comprises: performing a first injection with the air injector at the injection pressure above the peak pressure of the cylinder during a first portion of the compression stroke, when the piston in the cylinder is lower; performing a second injection with the air injector at the injection pressure above the peak pressure of the cylinder during a second portion of the compression stroke, when the piston in the cylinder is higher; and performing a fuel injection with the pre-chamber fuel injector at the injection pressure above the peak pressure of the cylinder during the second portion of the compression stroke. In any or all of the preceding examples, the method additionally or optionally further comprises: adjusting an amount of fuel injected into the cylinder based on an amount and composition of pre-chamber gases in the cylinder during the compression stroke. In any or all of the preceding examples, additionally or optionally, the amount and composition of the pre-chamber gases in the cylinder during the compression stroke are determined in part based on the injection pressure of the air injector and the injection pressure of the pre-chamber fuel injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining an amount of gases purged from a pre-chamber to a cylinder based on a pressure difference between the pre-chamber and the cylinder during purging; and
   adjusting fueling to the cylinder based on the amount of gases purged from the pre-chamber to the cylinder.

2. The method of claim 1, further comprising determining a composition of the gases purged from the pre-chamber to the cylinder based in part on parameters of a previous pre-chamber combustion event, and wherein the purging includes actuating an air injector of the pre-chamber during a compression stroke of the cylinder.

3. The method of claim 2, wherein the composition includes at least one of pre-chamber air, pre-chamber fuel, and pre-chamber exhaust gas, and wherein adjusting the fueling to the cylinder includes:
   increasing the fueling to the cylinder as an amount of pre-chamber air increases;
   decreasing the fueling to the cylinder as an amount of pre-chamber fuel increases; and
   decreasing the fueling to the cylinder as an amount of pre-chamber exhaust gas increases.

4. The method of claim 2, wherein the parameters of the previous pre-chamber combustion event include a pre-chamber fuel injection pressure, a pre-chamber fuel injection amount, a pre-chamber air injection pressure, a pre-chamber air injection amount, and a pre-chamber spark timing.

5. The method of claim 1, wherein the pressure difference between the pre-chamber and the cylinder during the purging is determined based on an injection pressure of an air injector of the pre-chamber and a piston position of the cylinder, and wherein the injection pressure of the air injector is at least equal to a peak pressure of the cylinder.

* * * * *